C. L. PRAEGER.
Car-Starters.

No. 151,052.

Patented May 19, 1874.

WITNESSES:

INVENTOR:

BY

ATTORNEYS.

UNITED STATES PATENT OFFICE.

CARL LUDWIG PRAEGER, OF NILES, MICHIGAN.

IMPROVEMENT IN CAR-STARTERS.

Specification forming part of Letters Patent No. 151,052, dated May 19, 1874; application filed April 11, 1874.

*To all whom it may concern:*

Figure 1:
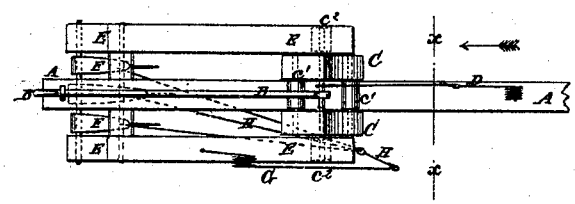
Figure 2:
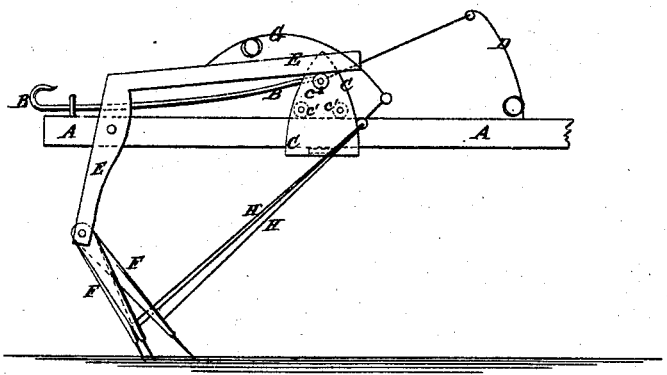
Figure 3:
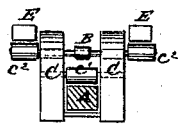

Be it known that I, CARL LUGWIG PRAEGER, of Niles, Berrien county, Michigan, have invented a new and useful Improvement in Car-Starter, &c., of which the following is a specification:

Figure 1 is a top view of my improved device. Fig. 2 is a side view of the same. Fig. 3 is a rear view of the same, partly in section, through the line $x\ x$, Fig. 1.

My invention has for its object to furnish an improved device for starting street-cars, freight-cars, and other objects to be moved, which shall be simple in construction, convenient in use, and effective in operation. The invention consists in the combination of the carriage, provided with friction-rollers, the inclines, the pointed arms, the springs, and the draw-hook with each other and the draw-bar, as hereinafter fully described.

A is the draw-bar, which is attached to the car or other object to be moved. B is the draw-rod, which passes through a keeper attached to the upper side of the forward end of the bar A, and has a hook formed upon its forward end for the convenient attachment of the draft. The rear end of the rod B is attached to a carriage, C, which moves back and forth along the bar A, and which rests upon rollers $C^1$ to diminish the friction. D is a coiled or other spring attached to the rear part of the bar A, and connected with the carriage C to draw said carriage back when released from the draft strain. To the sides of the carriage C are pivoted friction-rollers $C^2$, upon which rest the inclines or levers E, which are pivoted to the sides of the forward end of the bar A, and the ends of which project downward and have pivoted to them a series of arms, F, the lower ends of which are pointed or so formed as to take a firm hold upon the ground, and should slightly differ in length. By this construction, when the draft is applied the carriage C is drawn forward and the rollers $C^2$ act upon the inclines E, forcing the arms F into the ground or road-bed, and starting the car or other object to be moved.

It will be observed that the device acts with greatest power at the beginning, when the inertia of the car or object to be moved is to be overcome. As the carriage C moves forward the inclines become steeper until the said carriage has reached the forward end of bar A, when all move together.

G is a spring attached to the inclines E, and which is connected with the arms F by rods or chains H, to raise the said arms F away from the ground when their points are released by the forward movement of the car.

The springs G may be omitted and an arrangement of levers used for raising the arms F from the ground, if desired. This arrangement is preferred, as it prevents the said arms from dropping to the ground should the draft strain be slackened; or the arms F may be raised from the ground as soon as the car is running by the revolution of the axle, which is provided with an eccentric brake placed inside a ring, through which the axle passes, and which is provided with two chains, one fixed to limit the movement, and the other passing over guide-pulleys to the said arms F. The arms, when raised, are supported by a catch, which can be released at will when it is desired to have the said arms drop to the ground.

The inclines E may be varied in form, and may be arranged in various ways without departing from my invention.

Having thus described my invention, I claim as new and desire to secure by Letters Patent—

The combination of the carriage C, provided with friction-rollers $C^1\ C^2$, inclines E, arms F, springs D, draw-hook B, and the draw-bar A, substantially as shown and described.

CARL LUDWIG PRAEGER.

Witnesses:
JAMES T. GRAHAM,
T. B. MOSHER.